Patented June 29, 1926.

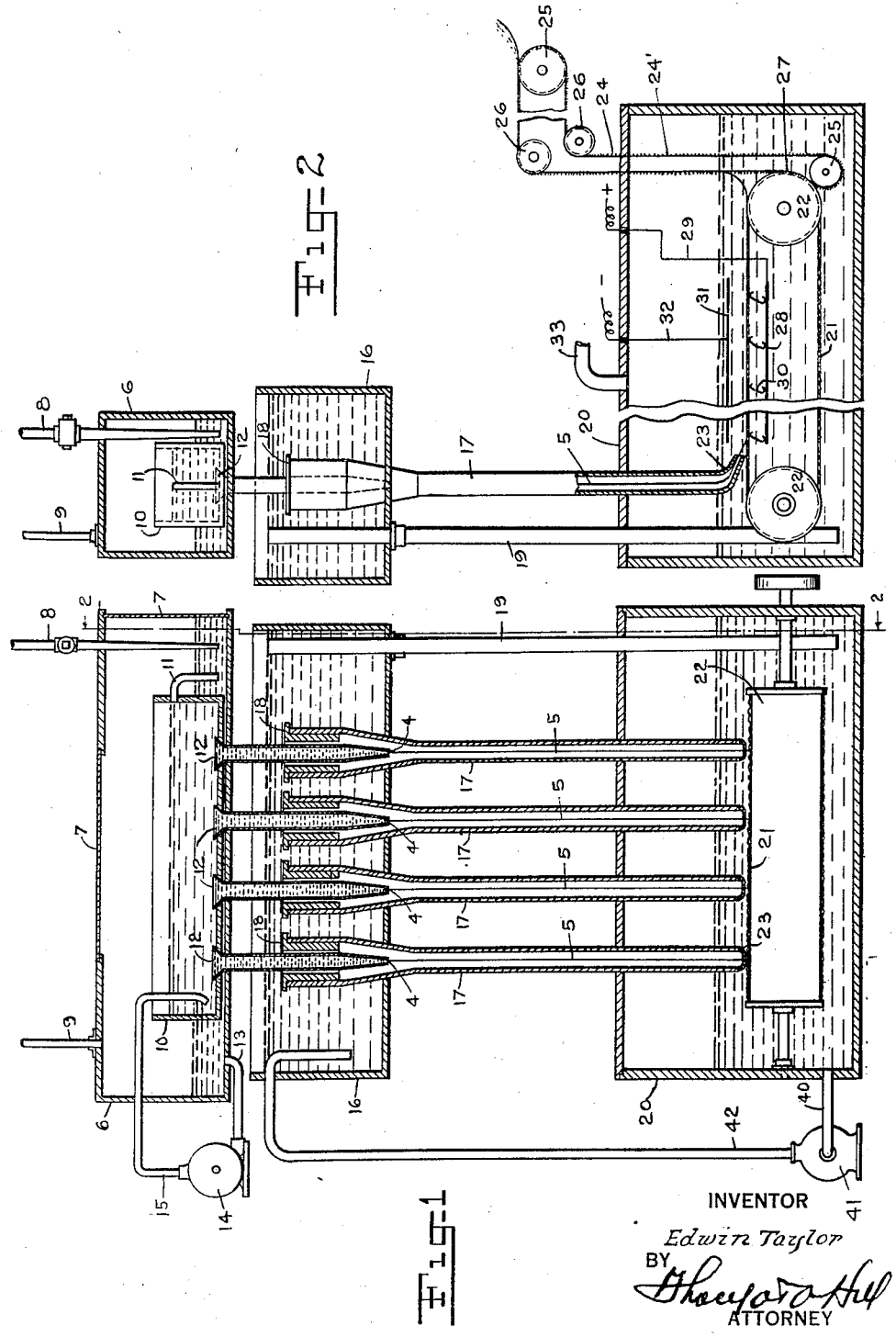

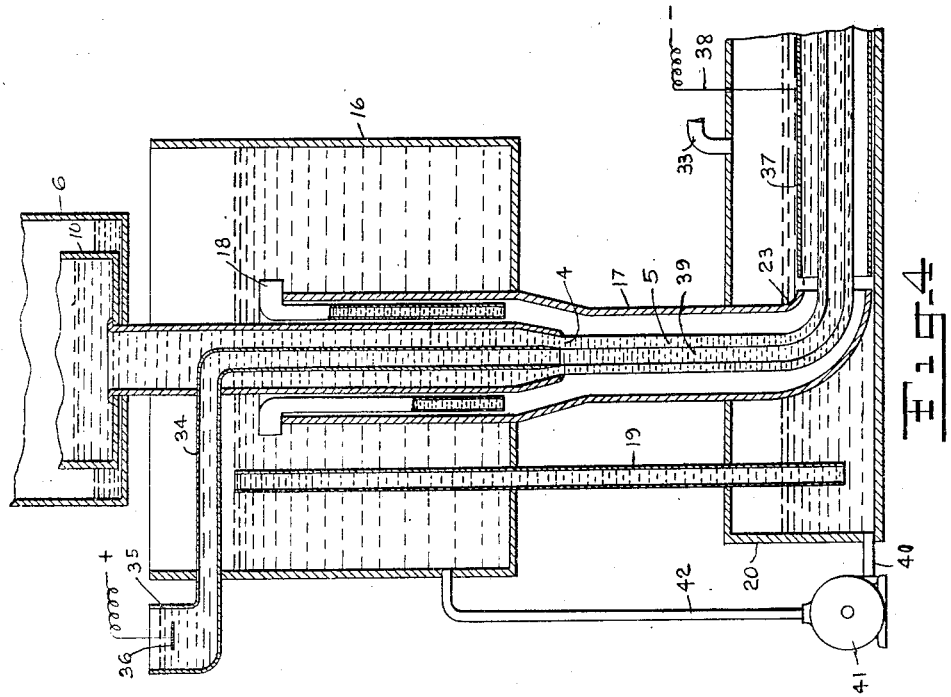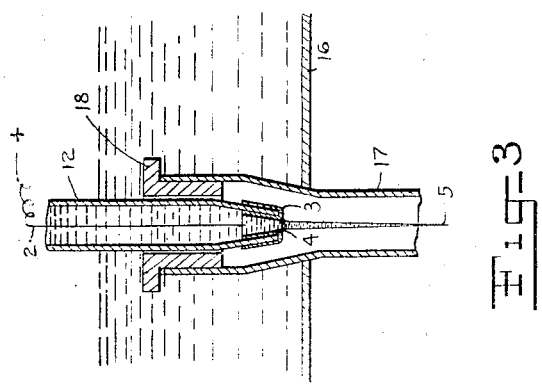

1,590,594

UNITED STATES PATENT OFFICE.

EDWIN TAYLOR, OF BROOKLYN, NEW YORK, ASSIGNOR, BY MESNE ASSIGNMENTS, TO TAYLOR LABORATORIES, INC., OF NEW YORK, N. Y., A CORPORATION OF NEW YORK.

TREATMENT OF FIBROUS OR CELLULAR ORGANIC MATERIAL.

Application filed March 11, 1920, Serial No. 364,980. Renewed June 17, 1924.

My invention relates to improvements in the treatment of fibrous or organic material and the conversion to other forms adapted for various uses. While the invention in its broadest aspects is applicable to numerous organic materials, it is especially applicable to the treatment and conversion of cellulose or cellulosic materials such as cotton, mixtures of silk and cotton, etc.

In the manufacture of artificial silk, strong filaments of extremely small diameter may be formed and of practically continuous length. According to my invention I may convert organic material into colloidal solution and then into solid material of definite contour, without mechanical means of support during the transition from the colloidal to the solid state, and recover the elements whereby the colloidal solution was effected.

The invention is adaptable for the manufacture of materials having one or more of the cellulose nitrates as a basis. As applied in the manufacture of smokeless powder the material may be formed, granulated, etc., before nitration thereby eliminating the use of volatile solvents for converting the nitrocellulose from the fibrous to the colloid state as is done at present.

My invention is based primarily on the facts that cellular or fibrous cellulose may be dissolved in various solvents containing a plurality of chemical elements, at least one of said elements being a metal and at least one being volatile, such as a solution of zinc chloride, or a solution of hydrated cupric oxide in concentrated ammonia, and by such solution the cellulose is converted from the cellular or fibrous condition to a colloidal state. The resulting cellulose solutions may be freely diluted with water before causing precipitation of the cellulose, and the precipitation of the cellulose, possibly somewhat chemically changed, is caused instantaneously by strong acids, or more slowly and practically without modification, by passing the cellulose solution through a direct current electrical field, whereby the cellulose tends to adhere to the anode, the metallic constituents deposits on the cathode, and the volatile or gaseous constituent will be released from solution.

If a viscous, concentrated solution of cellulose is poured into pure water partial solution ensues, the solution spreads out absorbing water as it does so, until the cellulose precipitates in thin sheets or flakes without definite form. If however a similar solution be passed or flowed into a bath of sulphuric, nitric or acetic acid, so dilute as to just prevent admixture of water, (probably by the formation of an extremely thin film of cellulose hydrate on the outside) the viscous cellulose tends to preserve the original form (cord, tube or plate) in which it entered the bath, being greatly aided in maintaining its shape by the flotation effect of the bath, and the consequent reduction of gravitational stresses tending to deform it such as would be encountered in working in the open air.

It will be understood that at this stage, the cellulose consists of a viscous mass surrounded by a thin protective layer, tending to preserve its original shape. If now this mass be floated and passed thru an electrolytic field between electrodes, the cellulose tends to adhere to the anode but is prevented from doing so by the protective film of hydrate on the outside. This protective film however is a permeable membrane and offers but little resistance to the passage of the mineral constituent which deposits on the cathode and may be recovered, the volatile constituent is likewise released and may be recovered while the cellulose itself is converted into a transparent, or in thick layers of a translucent and more or less rubbery mass, which may be readily handled and still preserves the original shape in which it entered the bath. This causes a removal of the solvent constituents from the cellulose.

It is apparent that while the cellulose is still viscous, before this solvent removal, that if it were subjected to external strains such as pressure or put under tension, its contour may be greatly varied. For instance if it were forced into dilute acid through a a hollow nozzle or die, provided with means for simultaneously ejecting dilute acid through its centre, the cellulose solution would issue in a tubular form having a protective film or coating both outside and inside, and its walls would be prevented from collapsing or adhering by this inside film, and also by the acid solution in the interior. If now the tube is put under tension by any desirable means, it may be stretched and its diameter and thickness of wall correspondingly reduced. If during this stretching, the tube be passed through an electric field and the solvent removed as above, the result will be a homogeneous tubular cord of practically pure cellulose having an almost glass-like appearance. If a plain nozzle of rather small opening be used and the tension accurately regulated, as described later, filaments of extreme fineness may be continuously drawn out, removed of their solvent constituents electrically, and after washing and drying under tension, a product may be obtained of pure cellulose having ample strength and a brilliant lustrous appearance. The degree of fineness is greatly enhanced by the diametrical shrinkage (about 85%) during drying. There is but little difficulty in drawing threads .001" in diam. while wet and the dried product is well under .0002" in diam. when dried under tension.

All that has been said above may be considered merely as a means for converting cellular or fibrous cellulose into colloidal or homogeneous cellulose having some calculated or definite shape such as a sheet, rod, wire, tube or filament.

It is evident that such a material in definite shapes may have a wide commercial application, particularly as the cost is low owing to the fact that the processes are all continuous, the machinery required is cheap and easily erected, the solvent materials all readily recoverable, and the cheapest forms of cellulose may be employed without expensive preliminary treatment such as washing with alkalies, picking, drying, etc.

By my new process, raw cotton or other cellulose may be dissolved in, for instance, the well known cupro-ammonia solution and filtered under pressure. Washing and drying of the cotton are unnecessary as the natural oils or resins, or oil or grease accidentally acquired, which would interfere with nitration, are in this case saponified, etc., by the ammonia solution, and are removed during subsequent operations, while the grosser impurities are left behind on the filter bed. I prefer to effect the solution at a comparatively cool temperature, say about 40° F. and keep the solutions at or about this temperature subsequently. After passing the filter, the cellulose seems to be in typical colloidal solution. In any event, if this more or less viscid solution be placed in a swinging bucket centrifugal, and "whizzed" for a few minutes, the solution at the bottom of the buckets will be found to be materially concentrated, while oil, grease etc., together with a comparatively dilute cellulose will be at the top. The top layers with any oil are removed, and the cellulose, separated from oil etc., and returned to fresh solutions. The concentrated cellulose is now ready for the forming operations, removal of solvent constitutents etc., as outlined above.

For the formation of tubes, extremely fine filaments and the like special apparatus is employed as shown in the accompanying drawings of which Fig. 1 represents in vertical cross-section a suitable form of apparatus for the drawing of fine filaments. Fig. 2 is a cross-sectional elevation at right angles to Fig. 1. Fig. 3 is a modified form of nozzle and electrode. Fig. 4 is a vertical cross-section of apparatus for the forming or drawing of tubes.

Referring to the drawings 6 is a closed tank provided with a plate of glass 7. 8 is a pipe for filling under pressure, and 9 is a pipe for the ammonia. Inside of tank 6 is a second tank 10 fitted with an outlet 11 reaching nearly to the bottom of tank 6. 12 is a series of outlet nozzles of uniform dimensions provided with outlet orifices 4 of exact size and preferably made of glass extending through the bottom of both tanks. At the lower part of tank 6 is an outlet pipe 13, connecting with a circulating pump 14, which in turn connects with pipe 15 extending through the wall of 6 and nearly to the bottom of tank 10. Below is another tank 16, provided with downwardly extending draft-tubes 17 of larger diameter at their upper extremities and of somewhat funnel-shaped contour. The nozzles 12 extend into the draft-tubes 17, to a point somewhat above the commencement of smallest diameter at 17. The nozzles 12 are centered and held spaced in the upper ends of tubes 17 by a series of separators 18, which also serve to prevent swirling of the flow of liquids passing between the nozzles and the tubes. Tank 16 is provided with an outlet tube 19 extending downward from a point above the level of the tubes 17, and the spacing partitions 18 nearly to the bottom of another closed tank 20. Tank 20 is provided near the bottom with an outlet pipe 40, connecting with a circulating pump 41, which is provided with a delivery pipe 42, extending to a point near the bottom of tank 16. Slightly above the bottom of tank 20 is an endless metallic screen or belt 21, driven at a constant speed upon the drum or roller 22. The draft tubes 17, extending downwardly from tank 16 are preferably provided at their lower extremities with curved ends 23, so disposed that material issuing from them will be deposited on or slightly above the belt in a direction parallel to the belt movement. Near the further end of tank 20 and approximately at right angles with belt 21 is a second endless belt 24 made of suitable fabric and provided on its outer surface with short rather stiff bristles 24'.

dilute acid is kept flowing through the draft-tubes 17, by means of pump 41. Cellulose solution from tank 7 is forced through the orifices 4 of the nozzles 12 at a slower rate than the speed of the liquid in the draft-tubes, the cellulose tending to assume a tubular form on account of the presence of the end of the tube 34. At the same time water containing only enough acid to cause it to conduct an electric current is caused to flow from reservoir 35 through tube 34, to the centre of the cellulose solution issuing from the orifices 4. The liquid coming from tube 34, performs two functions; it prevents collapse of the tube of viscous cellulose and by means of a current from electrode 36, serves as an anode 39, during forming and drawing of the cellulose tube and throughout the removal of the solvent constituents. The viscous cellulose tube 5 caught between the descending columns of liquid, is put under tension by their friction in passing and its speed accelerated with a consequent elongation and a reduction in the thickness of the tube wall. Almost any desired size of tube may be obtained by variations in size of tube 34, of the orifice 4 and by the relative speeds of the cellulose solution and of the descending columns of liquid. After passing down the draft tube 17, tube and liquids pass through a directional outlet 23, at the extremity of 17, and thence through the tubular cathodes 37, where the solvent constituents are removed as before noted. The finished tube after passing the electrode 37 is wound on reels or cut to suitable lengths for handling as it emerges, is washed well in running water and is ready for further desired operations or uses. It is apparent that variations in the cross-section of the finished tubes, oval, squares, hexagonal, etc., may be closely approximated by corresponding variations in the various tubes nozzle-orifices and draft tubes.

By splitting the tubes lengthwise after forming and passing through calendar rolls, etc., flat ribbons of any desired length or other dimension suitable for photographic films, etc., may be obtained. Any desired shape may be given to the faces of these films or ribbons, corrugations, etc., by variations in the shape of the orifices or by mechanical pressure after forming and splitting.

It is obvious that in place of employing a single central tube 34, a plurality of such tubes, spaced as desired may be used and the solution of organic material between and around them, the finished material having a corresponding number of holes or perforations of the same general shape as the cross-sections of the tubes 34 and nozzle 12 at their outlets. This is particularly adapted for the manufacture of multi-perforated smokeless powders.

In the manufacture of tubular smokeless powders, it is sometimes desirable to have an outer coating having a slower rate of burning for the purpose of increasing the gas volume liberated per instant of time as the grain burns. This is accomplished by first forming a cellulose tube, nitrating the same and finally passing it through the above apparatus, washing, drying, etc., whereby a dense layer of cellulose having a very low burning rate is firmly deposited on the explosive tube, the coated material being cut to grains of any desired length while still moist.

In the application of this process and its modifications as applied to silk advantage may be taken of the fact that silk will dissolve in nickel ammonia solution, while cotton will not, although cupro-ammonia dissolves both. Mixed silk and cotton waste goods, etc., may be separated and rendered of increased commercial value by first treating the mixed material with nickel-ammonia whereby the silk is dissolved and removed from the cotton by filtration. The cotton may now be dissolved in cupro-ammonia and the silk and cotton solutions either singly or mixed in definite proportions, passed through any of the apparatus described above for the production of tubes, rods, filaments, etc., of either silk or cellulose or mixtures of both.

All of the above products may be dyed or colored as readily as the natural fibers or cells of corresponding material silk, cotton etc., and the strength of the filaments obtained is but little less than the natural fiber.

As to the processes in general, the utmost care should be exercised to avoid all dust and dirt. The solutions must be carefully filtered and dirt kept out afterward. All the apparatus should be closed in wherever possible. The water employed for making up the solutions should be distilled or at any rate contain a minimum of mineral salts and should be free from carbonic acid gas if a fine filament or a perfectly transparent product is desired. In working with the ammonia solutions, carbonic acid is very objectionable on account of the formation of ammonium carbonate and its subsequent splitting up into its gaseous constituents during electrolysis, the $CO_2$ released being practically insoluble and clouding the film or filament by the formation of minute bubbles.

Air or other gas bubbles in the organic solutions must also be avoided and for this reason all pipes for filling and circulating should dip well below the surface and must be kept full of liquid at all times.

The strength of the acid water must also be kept within reasonable limits although this is easy on account of the large volume in the tanks compared to the amount circulated, changes in concentration taking place slowly. This acid water should also be kept free from grosser impurities and from $CO_2$.

Any filtered soft water will do for washing. The strength of the acid employed is a variable factor depending upon whether the cellulose, etc., is subjected to the electrolyzing current during the forming or whether the formed material must be transported some distance before coming under its influence. It is best found by experiment for any particular case although I have never used above 3/4 of 1% and from 1/4 to 1/2% is generally sufficient of sulphuric acid.

For the purpose of acidulation, particularly with the ammonia solutions, I prefer to use nitric acid as its ultimate product under electrolysis is always ammonia. The bath may be kept to strength by the simple addition of nitric acid, the ammonia released from the organic solution or formed by electrolysis being readily drawn from the top of the tanks and directly recovered, and any residual acid easily removed from the cellulose, etc., by washing. With sulphuric acid, ammonium sulphate forms, the ammonia is only partially released by the current and residual sulphate and sulphuric acid are not so readily removed by washing and the deposited organic material after dying is generally more tender and brittle especially in thick sections.

Definite figures on the electrical current employed are also difficult to give on account of the many variations of the general process. A direct current is preferable; a pulsating current in one direction gives good results but takes a longer time. The problem is an electro-chemical one and the rate of deposition of both cellulose and metal is a function of the amperage rather than of voltage. For cathodes a metal similar to the one used in the solvent, copper, nickel, zinc, etc., should be employed. With a little attention to the amperage passed all these metals may be deposited in a somewhat spongy condition and while adhering well to the cathode, may be easily scraped therefrom in a condition to be readily redissolved for the preparation of new solutions.

For dissolving the organic material, cellulose, silk, etc., if the solution is to be an ammoniacal one, I prefer to saturate 30% ammonia water, free from carbonate of ammonia, etc., with hydrated cupric or nickel oxides. The solutions are filtered through fibrous nitro-cellulose, cooled to about 40° F. and saturated with the material to be dissolved in suitable mixing machines. The amount of material dissolved depends largely upon the fiber, etc., used varying somewhat with each different quality or grade of the same kind of material. Some raw cottons for instance will completely dissolve in the proportion of 1 lb. cotton to 20 lbs. of cupra, while with other varieties, 1 lb. cotton to 35 lbs. solution is the best that can be done. When using zinc chloride, I employ a saturated solution of the C. P. salt in distilled water, these solutions being even more sensitive to impurities than the ammonia ones and more difficult to handle and recover.

After solution is complete the viscous mass is allowed to stand for about 24 hours, during which time it becomes much more fluid and may be forced through a filter by means of pressure. A fine sand bed on top of a layer of nitro-cotton, which in turn is supported by a fine wire screen is quite satisfactory. When desired the solutions are now concentrated by centrifugal action.

At this stage other ingredients may be added to the more or less fluid solution. For instance, if a saturated solution of cotton, or other cellulose in cupro-ammonia is employed it is evident that if more cellulose, say in a fibrous but rather finely divided state be added, this latter addition will be practically unaffected by the solution but it will increase the viscosity of the mass, necessitate a higher pressure to force it through the nozzles or dies and will materially reduce the shrinkage on drying, the result being a material of practically the same chemical composition throughout, part of which is in the fibrous or cellular condition and part of which has been solidified from a colloidal condition. The finished material differs but little in appearance from the solid cellulose but in thick sections at least has a greater elasticity and tensile strength. Any material may be added to any of the organic solutions provided such material or its product with the organic solution remains undecomposed by the subsequent passage of the electric current. As an example fine kaolin, various oxides and salts of barium, calcium, magnesium, etc., incorporated with cellulose solutions result in a finished material scarcely to be distinguished from colored celluloid but far cheaper to produce. Any color may be obtained either by adding coloring matter unaffected by the solutions, or by dyeing the finished product.

For the manufacture of gas mantles, etc., nitrates of the rare earth metals, thorium, zirconium, etc., may be mixed in definite proportions with a cellulose cupro-ammonium solution and the mixture formed into threads by the apparatus shown in Fig. 1, the solvent constituents recovered by the electric current and the resulting cellulose threads or cords, with their content of metallic nitrates practically unaffected, woven into any required shape. I prefer to use extremely dilute nitric acid for the bath and for drawing these threads and to keep them at all times under the action of the electric current by means of the nozzle electrode shown in Fig. 3. Prolonged washing of the threads after leaving the current is inadvisable as the enclosed nitrates are dissolved. The slight trace of acid present disappears on drying. The finished mantles are very strong and may be burned off as usual.

The variation in finished material which may be produced by these admixtures is almost unlimited, the smokeless powder containing celluloses of different degrees of nitration and in different physical condition as mentioned above, being a good example.

None of the above products are hydroscopic in the strict sense, remaining dry to the touch and preserving their shape under any condition of atmospheric moisture. In common with all celluloses, however, when immersed in water, they absorb a definite amount, swelling somewhat and increasing in length but without losing strength or general shape, and returning to their original dimensions when dried.

It is this property of absorbing water while still retaining shape, the state of so-called "solid solution" which permits of the ready displacement and removal and ultimate recovery of the solvent constituents, copper, ammonia, etc., by the electrical current, aided by osmosis or dialysis through the substance of the formed cellulose.

The tendency to absorb water when in direct contact with it, of the various formed products may be greatly reduced by prolonged boiling or steaming in various volatile solvents for instance, amylacetate particularly if mechanical pressure be applied at the same time.

The material produced by the above process or processes is in most cases capable of being again dissolved by solvents having the same constitution as those originally used and any trimmings, misshapen pieces, etc., may be redissolved and added to fresh solutions thereby reducing waste of raw or finished material.

It is well known in the manufacture of cellulose from solutions containing a metal, that great difficulty has confronted attempts to remove all traces of the metal from the cellulose so that the finished product would be absolutely free of metal. Various methods have been proposed and tried; i. e., when copper is employed for instance, the product (cellulose) has been washed in an acid bath. The acidulated wash-bath dissolves the copper from the product but slowly, the process being delayed by the coagulation of the surface exposed to the bath and by the gradual dilution of the acid solution. To hasten the removal of the copper from the coagulated cellulose, it has been proposed to pass an electric current through the bath, which has the effect of throwing down or depositing the copper in the metallic state, thus rejuvinating the bath, or as might be said, causing the bath to retain a substantially uniform degree of acidity, as will be understood. One of the disadvantages of this scheme results from the extent to which the cellulose becomes coagulated at and below the surface, leaving a core from which, even under prolonged treatment, complete removal of the metal and traces of the acid solvent cannot be removed. Another shortcoming results from the fact that owing to the electrical characteristics of cellulose, the action, so far as its effect upon the cellulose is concerned, is inherently superficial, the path of the current being around the material and not through it, etc. It is in this respect that the present system of producing cellulose differs widely from previous methods of manufacture. Based upon my discovery that cellulose may be produced electrically in a substantially pure state, I have made use of this fact, in the production of cellulose products, treating the same in such a manner that by passing a current of electricity through the mass a homogeneous structure results of uniform quality throughout. This it will be understood is due primarily to the expulsion of the solvent, etc., impelled at is were from the product by the dynamic action, which is the result of the ionic flow initiated by the electric current.

In my methods hereinbefore discussed, I am not limited to the use of acids for a supporting medium. Solutions of sodium chloride, ammonium chloride, or in fact of any salt that will not readily mix with or chemically affect the cellulose solutions may be employed. Ammonium nitrate gives splendid results and may be preferred, as its ultimate product under electrolysis is ammonia which may be used over and over again.

While I have described my improvement in great detail and with respect to preferred embodiments thereof, I do not desire to be limited to such details and forms since many changes and modifications may be made and the improvements embodied in widely different forms without departing from the spirit and scope of the invention in its broader aspects; hence I desire to cover all modifications and forms coming within the language or scope of any one or more of the appended claims.

What I claim as new and desire to secure by Letters Patent, is:—

1. A process of treating fibrous or cellular organic material which consists in forming a colloidal solution of organic material of definite proportions, supporting said solution in a medium adapted to preserve these dimensions, removing the solvent constituents by means of an electrical current passed through said formed colloid thereby converting the colloidal solution to a homogeneous solid of the same contour, and recovering the solvent constituents.

2. A process of treating fibrous or cellular organic material which consists in converting fibrous or cellular organic material to a colloidal condition by dissolving the material in a solvent containing a metallic element forming the colloidal solution to a predetermined shape by suitable forming means, immersing the formed colloid in a medium adapted to support it and to form a protective film or coating around it, passing an electric current through the formed and supported colloid, thereby causing the metallic solution constituent to deposit on a cathode, the gaseous element to enter the supporting medium, and the organic material still preserving its colloid shape to adhere or tend to adhere to an anode.

3. A process of treating fibrous or cellular organic material which consists in passing a colloidal solution of organic material at a constant speed through suitable forming means, enveloping the formed colloidal solution as it issues in a medium adapted to form a protective film about it, causing said medium to flow in a direction parallel to the issuing colloid at a constant but greater speed than the colloid, creating a tension upon the issuing colloid by means of this difference in speed, thereby varying the dimensions of the issuing colloid.

4. A process of treating fibrous or cellular organic material which consists in submitting a moving colloidal solution of organic material of definite shape to tension caused by the difference between its speed and the speed of a surrounding and supporting medium, and to the action of an electric current, thereby removing the solvent constituents in a condition permitting their recovery and leaving the organic material in a solid, homogeneous mass of the general contour of the colloidal solution but of different dimensions and having the same chemical constitution as the original organic material.

5. A process of treating fibrous or cellular organic material which consists in admitting a fluid to the center of a flowing mass of colloidal material surrounded and supported by a medium which is non-solvent of the colloid and which moves at greater speed, passing an electrical current through the colloid mass by causing the centrally admitted fluid to become an anode, thereby causing the organic material to tend to deposit in this fluid-anode, the metallic solution constituent to deposit on a cathode exterial to and surrounding said fluid anode, and the organic material to be obtained in a solid condition and of a tubular section, of a diameter and thickness of wall regulated by tension caused by the difference in speeds of the moving organic solution, the internal fluid anode, and the external non-solvent supporting medium.

6. A process of treating fibrous or cellular organic material which consists in dissolving organic material in a solution containing a metallic element and a gaseous element, forming the resultant colloidal solution into a predetermined shape, submitting it to tension caused by the passage longitudinally with it, but at greater speed, of a body of acid fluid, non-solvent of the colloidal solution, passing an electrical current through both colloidal and acid solutions, thereby causing the separation of the colloidal solution into an organic solid, a metal and a gas, and also causing the acid constituent of the non-solvent fluid to be converted into a gas having the same chemical constitution as the gas released from the colloidal solution.

7. a process of treating fibrous or cellular organic material which consists in dissolving organic material in a solution containing a metallic element and a gaseous element, forming the resultant colloidal solution into a predetermined shape, submitting it to tension caused by the passage longitudinally with it, but at greater speed, of a body of acid fluid, non-solvent of the colloidal solution, passing an electrical current through both colloidal and acid solutions, thereby causing the separation of the colloidal solution into an organic solid, a metal and a gas, and also causing the acid constituent of the non-solvent fluid to be converted into a gas having the same chemical constitution as the gas released from the colloidal solution, utilizing the metal and the gases released from both solutions for the preparation of fresh solution of organic material.

8. The method of making shaped bodies of cellulosic which consists in dissolving cellulosic material to form solution thereof, passing the solution through a die and subjecting the resultant product to electrolysis to remove solvent constituents therefrom.

9. The method of making shaped bodies of cellulosic material which consists in providing a solution of the cellulosic material, forming the same with a die and subjecting the resultant product to electrolytic action.

10. The method of making shaped bodies of cellulosic material which consists in forming a concentrated solution of cellulosic material, passing the solution through a die to form a shaped body therefrom, and then subjecting the body to the action of electrolysis to remove solvent constituents therefrom electrolytically.

11. The method of making filaments, ribbons, tubes and the like of cellulose, which consists in forming a solution of cellulose and squirting the same through a die to form the same and electrolyzing the cellulose to remove solvent constituents therefrom.

12. The method of making shaped bodies of cellulose which consists in forming a solution of cellulose, passing the solution through a die into a liquid supporting medium and electrolyzing the cellulose to remove solvent constituents therefrom.

13. The method of making shaped bodies of cellulose which consists in forming a solution of cellulose, passing the solution through a die into a liquid supporting medium, and electrolyzing the cellulose solution while suspended in said medium.

14. The method of making shaped bodies of cellulose which consists in forming a solution of cellulose, passing the solution through a die into a liquid supporting medium, and electrolyzing the cellulose solution while suspended in said medium, and causing the liquid medium to move at a greater speed than the formed cellulose solution therein, but in substantially the same direction, to stretch the formed body of cellulose.

15. The method of making filaments, ribbons, tubes and the like of cellulose, which consists in forming a solution of cellulosic material, passing the solution through a die and permitting the formed cellulose to fall by gravity through liquid supporting medium, and electrolyzing the cellulose body while it is in suspension in said medium.

16. The method of making filaments, ribbons, tubes and the like of cellulose, which consists in forming a solution of cellulosic material, passing the solution through a die and permitting the formed cellulose to fall by gravity through liquid supporting medium, and electrolyzing the cellulose body while it is in suspension in said medium, and causing the liquid medium to move at a greater speed than the formed cellulose solution therein, but in substantially the same direction, to stretch the formed body of cellulose.

17. The method of making shaped bodies of cellulose which consists in forming a solution of cellulose, passing the solution through a die into a liquid supporting medium, and subjecting the cellulose to electrolytic action as it leaves said die.

18. The method of making shaped bodies of organic material which consists in forming a solution of the organic material, passing the solution through a die, and electrolyzing the formed organic material to remove solvent constituents therefrom.

19. The method of making filaments, ribbons, tubes and the like of organic material, which consists in forming a solution of the organic material, passing the solution through a die, into a liquid supporting medium, and electrolyzing the formed organic material while suspended in said medium.

20. The method of making filaments, ribbons, tubes and the like of organic material, which consists in forming a solution of the organic material, passing the solution through a die, into a liquid supporting medium, and electrolyzing the formed organic material while suspended in said medium, and causing the liquid supporting medium to move at a greater speed than formed organic material therein, to stretch the formed organic material.

21. The method of forming tubes of organic material, which consists in forming a solution of the organic material, passing the solution through a tube-forming die into a liquid in an electrolytic cell, and electrolyzing the formed organic material to remove solvent constituents therefrom.

22. The method of making shaped bodies of cellulose which consists in forming a solution of cellulose, passing the solution through a die into an acid liquid supporting medium and electrolyzing the cellulose to remove solvent constituents therefrom.

23. The method of making shaped bodies of cellulose which consists in forming a solution of cellulose, passing the solution through a die into a liquid supporting medium, and electrolyzing the cellulose solution while suspended in said medium, said medium being weakly acid.

24. The method which consists in forming a solution of cellulose and subjecting the same to electrolytic action to remove solvent constituents therefrom in a substantially non-acid conducting liquid medium.

25. The method which consists in subjecting a solution of organic material to electrolytic action, a solution of ammonium nitrate being used to conduct the current to or from the solution of organic material.

26. The method which consists in subjecting a solution of cellulose to electrolytic action in an electrolytic cell to remove solvent constituents from the cellulose, the cell containing ammonium nitrate solution as electrolyte or conducting medium.

27. The method which consists in subjecting a solution of cellulose to electrolytic action in an electrolytic cell to remove solvent constituents from the cellulose, the cell containing a non-acid solution as electrolyte or conducting medium.

28. The method which consists in placing a solution of organic material in an electrolytic cell with an electrolyte other than said solution of organic material and subjecting the solution of organic material to electrolytic action in the cell with said electrolyte, to remove solvent constituent from the organic material.

In testimony whereof I hereunto affix my signature.

EDWIN TAYLOR.

CERTIFICATE OF CORRECTION.

Patent No. 1,590,594. granted June 29, 1926.

to EDWIN TAYLOR.

It is hereby certified that error appears in the printed specification of the above mentioned patent requiring correction as follows: Page 1, line 5, for the word "broadest" read "broader"; page 7, line 83, for the word "electrically" read "electro-lytically"; page 8, line 103, claim 8, for the word "cellulosic" read "cellulose"; and that the said Letters Patent should be read with these corrections therein that the same may conform to the record of the case in the Patent Office.

Signed and sealed this 8th day of March, A. D. 1927.

Seal.

M. J. Moore,
Acting Commissioner of Patents.